(12) United States Patent
Pfister et al.

(10) Patent No.: US 12,259,337 B2
(45) Date of Patent: Mar. 25, 2025

(54) DETECTION AND CHARACTERIZATION OF DEFECTS IN PHARMACEUTICAL CYLINDRICAL CONTAINERS

(71) Applicant: SCHOTT PHARMA SCHWEIZ AG, St. Gallen (CH)

(72) Inventors: Andreas Pfister, Jonschwil (CH); Melchior Wedlich, St. Gallen (CH); Christian Kläger, Abtwil (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 656 days.

(21) Appl. No.: 17/032,664

(22) Filed: Sep. 25, 2020

(65) Prior Publication Data
US 2021/0231577 A1    Jul. 29, 2021

(30) Foreign Application Priority Data
Jan. 23, 2020   (EP) .................................. 20 153 400

(51) Int. Cl.
*G01N 21/90*    (2006.01)
(52) U.S. Cl.
CPC ................ *G01N 21/9009* (2013.01)
(58) Field of Classification Search
CPC .. G01N 21/9009; G01N 21/958; G01N 21/90; G01N 21/01
See application file for complete search history.

(56) References Cited

U.S. PATENT DOCUMENTS

| | | | |
|---|---|---|---|
| 2,531,529 A | 11/1950 | Price | |
| 4,378,493 A | 3/1983 | Dorf | |
| 4,500,203 A * | 2/1985 | Bieringer | G01N 21/9036 356/394 |
| 5,467,125 A | 11/1995 | Yoshida | |
| 5,473,425 A * | 12/1995 | Tokumaru | H01L 22/12 257/E21.53 |
| 5,895,911 A * | 4/1999 | Giometti | G01N 21/90 209/526 |
| 5,917,588 A * | 6/1999 | Addiego | G01N 21/8806 356/237.2 |
| 6,437,357 B1 * | 8/2002 | Weiss | G01N 21/896 250/559.46 |

(Continued)

FOREIGN PATENT DOCUMENTS

| | | |
|---|---|---|
| CN | 102159475 | 8/2011 |
| CN | 104062302 | 9/2014 |

(Continued)

OTHER PUBLICATIONS

D5—XP055885133: "Schott World—Mitarbeitermagazin", Schott World—Mitarbeitermagazin, vol. 1/2019, Jan. 1, 2019 (Jan. 1, 2019), pp. 20-21 + coverpage with English translation, 6 pages.

(Continued)

*Primary Examiner* — Solomon G Bezuayehu
(74) *Attorney, Agent, or Firm* — Ruggiero McAllister & McMahon LLC (57) ABSTRACT

An apparatus for inspecting a pharmaceutical cylindrical container made of glass or of a polymer is provided. A corresponding method for inspecting the pharmaceutical cylindrical container made of glass or of a polymer and to a bundle of pharmaceutical cylindrical containers made of glass or of a polymer is also provided.

21 Claims, 6 Drawing Sheets

(56) References Cited

U.S. PATENT DOCUMENTS

| | | | |
|---|---|---|---|
| 7,551,274 B1* | 6/2009 | Wornson | G01N 21/896 356/429 |
| 7,688,437 B2* | 3/2010 | Houck | G01N 21/90 382/142 |
| 7,781,723 B1* | 8/2010 | Furnas | G01N 21/90 209/526 |
| 7,816,639 B2* | 10/2010 | Diehr | G01N 21/9054 250/559.4 |
| 7,982,868 B2* | 7/2011 | Akkerman | G01N 21/9036 356/240.1 |
| 9,995,691 B2 | 6/2018 | Piana | |
| 10,060,858 B2* | 8/2018 | Schwab | G01N 21/8903 |
| 10,337,977 B1* | 7/2019 | Kuhn | G01N 21/85 |
| 2002/0015148 A1* | 2/2002 | Tomomatsu | G01N 21/8806 356/237.2 |
| 2005/0195480 A1* | 9/2005 | Brown | G02B 21/0092 359/489.07 |
| 2006/0045324 A1* | 3/2006 | Katayama | G01N 21/9054 356/240.1 |
| 2008/0094618 A1* | 4/2008 | Sones | G01N 21/9054 356/240.1 |
| 2008/0239301 A1* | 10/2008 | Yokota | G01N 21/9503 356/237.2 |
| 2008/0291438 A1* | 11/2008 | Akkerman | B07C 5/3404 356/240.1 |
| 2008/0297784 A1* | 12/2008 | LeBlanc | G01N 21/896 356/239.1 |
| 2010/0095790 A1 | 4/2010 | Raupp | |
| 2010/0111515 A1* | 5/2010 | Saitoh | G02B 6/0018 362/558 |
| 2010/0118136 A1* | 5/2010 | Riet | G01B 11/306 382/152 |
| 2011/0216187 A1* | 9/2011 | Bocker | G01N 21/9036 348/127 |
| 2012/0276177 A1* | 11/2012 | Hilliard, Jr. | A61K 8/26 428/338 |
| 2013/0084594 A1 | 4/2013 | Bresler | |
| 2013/0162986 A1 | 6/2013 | Kibat | |
| 2016/0054235 A1* | 2/2016 | Kim | G01N 21/94 356/237.3 |
| 2016/0231555 A1* | 8/2016 | Freifeld | H04N 23/55 |
| 2017/0053394 A1* | 2/2017 | Uemura | G06T 7/0008 |
| 2017/0154417 A1 | 6/2017 | Niedermeier | |
| 2019/0164269 A1 | 5/2019 | Kläger | |
| 2021/0088454 A1* | 3/2021 | Heuft | G01B 11/24 |
| 2021/0333221 A1* | 10/2021 | Klimmey | G06T 7/001 |

FOREIGN PATENT DOCUMENTS

| | | |
|---|---|---|
| CN | 104458760 | 3/2015 |
| DE | 102011113670 | 3/2013 |
| DE | 102016114190 | 2/2018 |
| EP | 2774678 | 9/2014 |
| EP | 3797883 | 3/2021 |
| EP | 3798621 | 3/2021 |
| EP | 3855173 | 7/2021 |
| EP | 3855174 | 7/2021 |
| JP | H0336949 | 4/1991 |
| JP | H0472554 | 3/1992 |
| JP | 2000214104 | 8/2000 |
| JP | 2005227257 | 8/2005 |
| JP | 2009229200 | 10/2009 |
| JP | 2015169449 | 9/2015 |

OTHER PUBLICATIONS

D5a—XP055885138: Schott World Jan. 2019 (KircherBurckhardt/Schott), pp. 20 and 21; document D5 in higher resolution with English translation, 4 pages.

* cited by examiner

DETECTION AND CHARACTERIZATION OF DEFECTS IN PHARMACEUTICAL CYLINDRICAL CONTAINERS

CROSS REFERENCE TO RELATED APPLICATIONS

This application claims benefit under 35 USC § 119 of European Application 20 153 400.5 filed Jan. 23, 2020, the entire contents of which are incorporated herein by reference.

BACKGROUND

1. Field of the Invention

The present invention relates to an apparatus for inspecting a pharmaceutical cylindrical container made of glass or of a polymer, wherein the apparatus comprises a support device, a light emitting unit and a light receiving unit. Further, the present invention relates to a method for inspecting a pharmaceutical cylindrical container made of glass or of a polymer.

2. Related Art

For quality assurance, it is common to inspect the finished pharmaceutical cylindrical container or intermediate products thereof during a manufacturing process. If a defect is detected, the product or the intermediate product can be disregarded from further processing.

From the document DE 10 2011 113 670 A1 an apparatus for the inspection of sheet glass is known. Further, the document DE 10 2016 114 190 A1 describes a method and a device for optical examination of transparent bodies.

Especially pharmaceutical cylindrical containers such as syringes, carpules, vials etc. have to fulfil strict quality standards. For example, it has to be avoided that these pharmaceutical cylindrical containers comprise defects like bulges, depressions, scratches, adhering particles, bubbles or trapped foreign material. Since pharmaceutical cylindrical containers are mass products, there is a need to develop an inspection system, which can measure the pharmaceutical cylindrical container very fast, and it would be further beneficial, if the speed is infinitely variable so that the system can react on variation of the production speed. Notwithstanding, it has to be assured that pharmaceutical cylindrical containers comprising any defects are reliably identified such that they can be disregarded from further processing.

Known apparatuses for inspecting pharmaceutical cylindrical containers do not fulfil the above mentioned requirements with regard to a fast, variable and reliable inspection.

SUMMARY

The invention described herein addresses the problem of improving and further developing an apparatus and a method for inspecting a pharmaceutical cylindrical container made of glass or of a polymer such that a fast and reliable inspection is achieved.

In an embodiment the present invention provides an apparatus for inspecting a pharmaceutical cylindrical container made of glass or of a polymer, wherein the apparatus comprises a support device, a light receiving unit and a light emitting unit, wherein the support device supports the pharmaceutical cylindrical container on its lateral surface, such that the pharmaceutical cylindrical container is rotatable around its longitudinal axis, wherein the light receiving unit comprises a main camera for acquiring an image of the pharmaceutical cylindrical container, and wherein the light emitting unit comprises with regard to the main camera a bright field light source, a radial dark field light source, and an axial dark field light source.

In a further embodiment, the present invention provides a method for inspecting a pharmaceutical cylindrical container made of glass or of a polymer, preferably with an apparatus according to any disclosed herein, comprising the following steps: arranging the pharmaceutical cylindrical container with its lateral surface on the support device, rotating the pharmaceutical cylindrical container around its longitudinal axis, preferably wherein the rotation is performed in increments, and activating the light emitting unit and the light receiving unit for acquiring at least one image of the pharmaceutical cylindrical container.

One of the advantages is that defects can be visualized and classified over the whole product since the pharmaceutical cylindrical container is supported on its lateral surface and can be rotated around its longitudinal axis so that light can shine through all walls of the pharmaceutical cylindrical container from different directions (bright field, radial and axial dark field). The rotation can be performed by an apparatus as described in the European patent applications 19200246.7 as filed Sep. 27, 2019 and 19200221.0 as filed Sep. 27, 2019, which are incorporated herein by reference. Since several images can be acquired it is possible to differentiate a defect of the object—which would be moving with the object when it is rotated—from a failure of the light receiving unit, for example a dirty objective. Furthermore, the described light emitting unit allows visualizing inner defects independent on the orientation of the defects as well as surface defects due to the different light sources being used. Another advantage is that an optimal synchronization between the rotation of the object, the activation of the light emitting unit and the light receiving unit can be realized with easy means such that a higher stroke and improved detection of the defects compared to state of the art systems can be achieved.

The term "pharmaceutical cylindrical container" refers to a cylindrical container, which can be used to store medical products, e.g. injection solutions or tablets. A pharmaceutical cylindrical container can be a syringe, a vial, an ampoule, a cartridge or any special article of tubing. The diameter of the pharmaceutical cylindrical containers being inspected by the apparatus according to the invention may be in the range of 4 mm to 80 mm, preferably 6 mm to 50 mm.

The term "longitudinal axis" refers to the line, especially the rotational axis that passes from the bottom to the top of the cylindrical part of the pharmaceutical cylindrical container. The diameter of the cylindrical part of the pharmaceutical cylindrical container to be measured can also be determined by the support device that supports the pharmaceutical cylindrical container on its lateral surface if the pharmaceutical cylindrical container is not present in the apparatus. For example, the support device exhibits three wheels surrounding and supporting the pharmaceutical cylindrical container and the diameter of the cylindrical part of the pharmaceutical cylindrical container to be measured is defined by the distance of the three wheels, when they are arranged in the inspection position.

Herein a "pharmaceutical cylindrical container" comprises at least a cylindrical part. Supporting the pharmaceutical cylindrical container on its lateral surface means that, preferably only, the cylindrical part of the pharmaceutical cylindrical container is supported on its lateral surface. A pharmaceutical cylindrical container like a syringe, a carpule or an ampule that comprises for example non-cylindrical ends is therefore a pharmaceutical cylindrical container. Further, the lateral surface of the pharmaceutical cylindrical container does not have to be smooth. The lateral surface can comprise grooves or ridges or ripples or any other structure. Further, the lateral surface can have a waved or any other shape as long as the pharmaceutical cylindrical container exhibits a longitudinal axis and can be rotated on its longitudinal surface. The container can be made of glass, e.g. aluminosilicate glass or borosilicate glass, or of a polymer, e.g. cyclic olefin copolymer (COC) or cyclic olefin polymer (COP). Preferably, the container is made of glass, more preferably borosilicate glass, or of a polymer, more preferably cyclic olefin copolymer (COC) or cyclic olefin polymer (COP). Most preferably, the container is made of cyclic olefin copolymer (COC). It should be noted that at least one of such a pharmaceutical cylindrical container can be a part of the apparatus and/or can be a part of the method.

Herein, a bundle is a trading, loading or packaging unit for distribution of pharmaceutical cylindrical containers. For example, products usually of the same kind are combined as bundles when ordered together in retail or bundled in logistics. According to the invention, pharmaceutical cylindrical containers in the bundle can be separated by a spacer, for example a plastic or paper sheet or can be positioned in a holding device, for example a nest, tub or tray, so that they are not in contact with each other during transport. Usually, but not necessarily, the bundle is at least partly covered by a plastic foil. Preferably, one bundle is encased in a plastic foil; more preferably, the bundle is encased in a plastic foil and all pharmaceutical cylindrical containers are sterilized, e.g. steam sterilized or sterilized by gamma rays. Due to economic reasons, the distance between two cylindrical bodies in a bundle is preferably less than 5 mm, more preferably less than 3 mm, more preferably less than 1 mm, more preferably less than 0.5 mm; most preferably to further reduce the size and weight of a bundle, the cylindrical bodies are in direct contact to each other. A bundle contains normally 10 or more, preferably 10 to 1000, more preferably 20 to 500, most preferably 40 to 250 pharmaceutical cylindrical containers. Examples of a bundle are the iQ™ platforms from SCHOTT AG, i.e. the ready to use platforms cartriQ™, adaptiQ™, or syriQ™ from SCHOTT AG. One or more, preferably 10 to 50, bundles can be stacked on a pallet or packed in a further box for transport. Thus, in one embodiment, a transport box comprises one or more, preferably 5 to 50, more preferably 10 to 25, herein described bundles.

Figure 1:
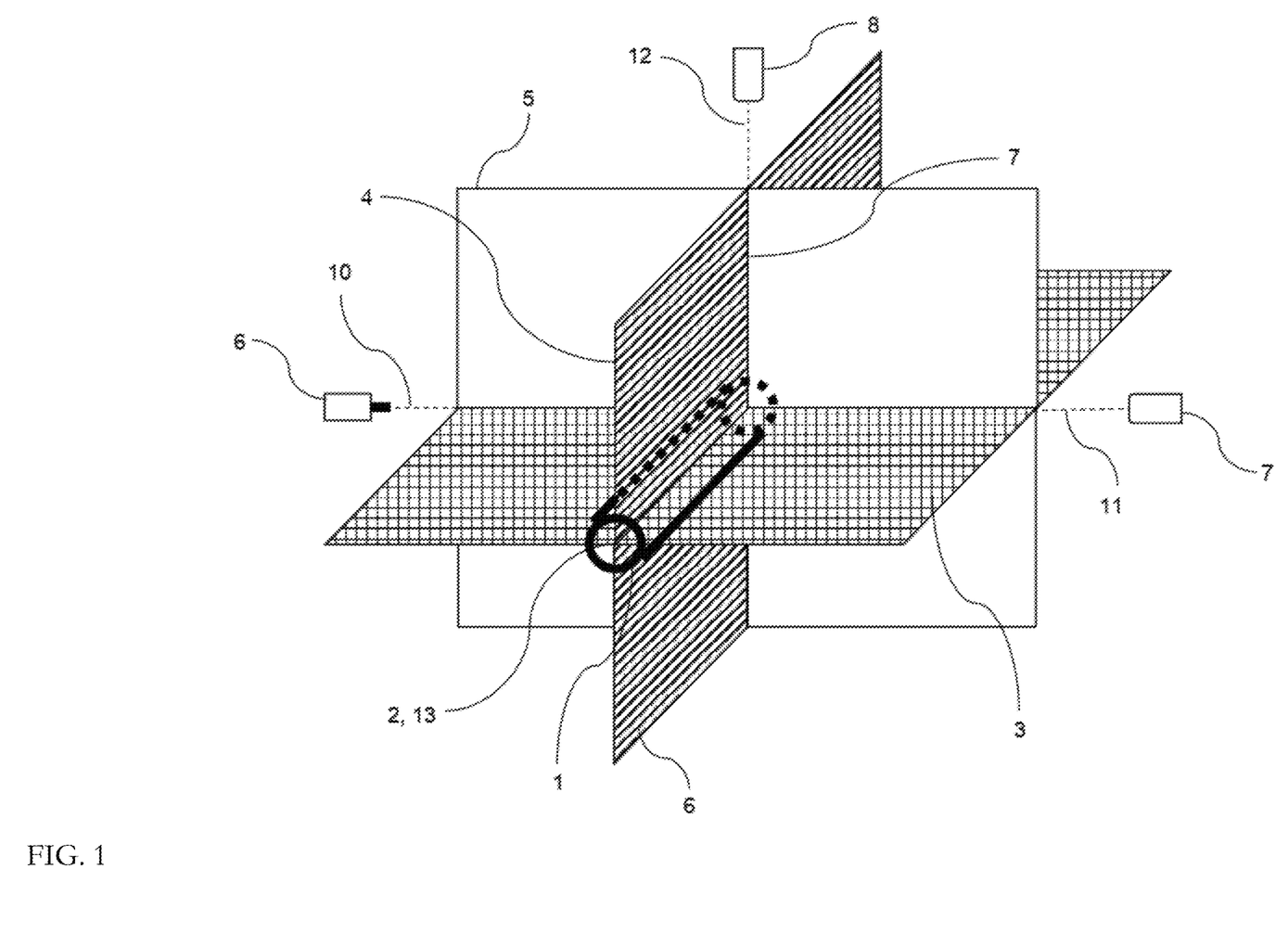
FIG. 1 shows in a schematic view an embodiment of an apparatus.

The longitudinal axis of the pharmaceutical cylindrical container and a horizontal axis being perpendicular to the longitudinal axis define a horizontal plane, further the longitudinal axis of the pharmaceutical cylindrical container and a vertical axis being perpendicular to the longitudinal axis define a vertical plane. In addition, a horizontal axis being perpendicular to the longitudinal axis of the pharmaceutical cylindrical container and a vertical axis being perpendicular to the longitudinal axis and intersecting the middle of a cylindrical part of the pharmaceutical cylindrical container define a transversal plane. The planes are depicted in FIG. 1. The above described planes are each orthogonal to each other. In this disclosure an intersection angle between a line, e.g. a centerline of a camera, and a plane, e.g. a horizontal plane, is the opposite angle of the angle between normal vector of the plane and the direction vector of the line. If the intersection is defined as 0°, the line and the plane are parallel. In general, each light source can comprise a light emitting plane, e.g. the bright field light source can comprise a bright field light emitting plane, and the dark field light source can comprise a dark field light emitting plane. A centerline of a light source or camera herein is a centerline extending from the middle of the light emitting plane of the light source or camera lens, respectively. Even if the apparatus herein is explained with regard to the above three planes, the whole arrangement can be rotated as long as the angles with regard to the pharmaceutical cylindrical container do not change.

Herein, the term "metallic defect" is to be understood in the broadest sense. Metallic inclusions are, in particular, inclusions of particles made of one or more predominantly elemental metal(s). The metal(s) of the metallic inclusions therefore usually have the oxidation state equal to 0. Metallic inclusions include in particular noble metals and refractory metals.

Herein, the term "non-metallic inclusion" is to be understood in the broadest sense. Non-metallic inclusions are in particular inclusions consisting of cations (oxidation level>0) and anions (oxidation level <0), also called salts. In particular, non-metallic inclusions include particles in the form of crystals from glass components and one or more salts of refractory metals and noble metals, in particular crystals from glass components and one or more silicates or oxides of refractory metals and noble metals.

The size of a defect herein is in the longest distance, which can be measured from any starting point to any endpoint of the defect.

Inclusions are usually counted as metallic inclusions if they consist essentially of elemental metal (approx. 100%; oxidation level 0), otherwise the inclusions are non-metallic inclusions. A distinction between metallic and non-metallic can be made by optical inspection of the defect by a skilled person.

Refractory metals are, for example, the metals titanium, zirconium, hafnium, vanadium, niobium, tantalum, chromium, molybdenum and tungsten.

Noble metals herein include semi-precious metals and are, for example, ruthenium, rhodium, palladium, osmium, iridium, platinum, silver, gold, copper, technetium, rhenium, antimony, bismuth and polonium.

Other examples of metals that can be included in the inclusions are magnesium, calcium, aluminum, silicon, tin (metallic inclusions) and salts thereof (non-metallic inclusions).

Herein, the term "bubble" is to be understood in the broadest sense. Bubbles are formed by gas inclusions in the glass, whereby the gas can be gaseous both at room temperature (20° C.) and can condense after cooling and a bubble with reduced pressure is formed. Gases that form inclusions include, for example, oxygen, nitrogen, nitrogen oxides, carbon dioxide, sulfur dioxide, etc.

The term "polarized light" refers to a ray of light, preferably with a wavelength in the range of 1 nm and 100 μm, more preferably 10 nm and 10 μm, most preferably 400 nm to 800 nm, that comprises a linear polarization, a circular polarization, or an elliptical polarization being detectable by know methods and/or apparatuses.

The term "unpolarized light" refers to a ray of light, preferably with a wavelength in the range of 1 nm and 100 μm, more preferably 10 nm and 10 μm, most preferably 400 nm to 800 nm, that does not comprise a linear polarization or a circular polarization, or an elliptical polarization being detectable by known methods and/or apparatuses.

According to the invention, the apparatus comprises a support device, wherein the support device supports the pharmaceutical cylindrical container on its lateral surface, such that the pharmaceutical cylindrical container is rotatable around its longitudinal axis.

Preferably, the support device comprises at least two support wheels and a friction wheel, wherein the friction wheel is arranged such that the pharmaceutical cylindrical container being arranged on the support wheels is rotatable around its longitudinal axis by the friction wheel. Preferred support devices are described in the European patent applications 19200246.7 as filed Sep. 27, 2019 and 19200221.0 Sep. 27, 2019, which are incorporated herein by reference. Herein, the lateral surface of the pharmaceutical cylindrical container is the outer surface of the cylindrical portion of the pharmaceutical cylindrical container. Preferably, there is not any direct contact of the apparatus to the base and top of the pharmaceutical cylindrical container. By laying the pharmaceutical cylindrical container with its lateral surface horizontally on the support wheels during the inspection, it is possible to shine light through at least almost the whole pharmaceutical cylindrical container. Hence, it is possible to inspect the pharmaceutical cylindrical container at least almost without any shadow if the pharmaceutical cylindrical container is held only on its lateral surface by the holding means and the friction wheel during the measurement. It is even possible that the top and/or the bottom portion of the pharmaceutical cylindrical container can be inspected, when the pharmaceutical cylindrical container is held only on its lateral surface by the holding means and the friction wheel during the measurement.

The light receiving unit comprises at least the main camera. Preferably, the light receiving unit comprises additional cameras. Each camera can comprise a lens. Preferably, the centerline of the main camera does not cross the support device, e.g. a wheel of the support device. More preferably, the centerline of the main camera does not cross anything before the centerline permeates the pharmaceutical cylindrical container. Preferably, the main camera acquires an image of at least the whole cylindrical part of the pharmaceutical cylindrical container. If not defined otherwise, a camera herein is the main camera. The total amount of cameras of the light receiving unit is not particularly limited.

The amount of cameras being arranged depends on the size of the pharmaceutical cylindrical container. As more cameras are used, as more images can be obtained within one time interval. For this reason, the light receiving unit comprises preferably 5 or more, more preferably 10 or more, more preferably 15 or more, most preferably 20 or more cameras. However, if the light receiving unit comprises too many cameras this distance of each camera to the pharmaceutical cylindrical container highly increases. Thus, the receiving unit comprises preferably 25 or less, more preferably 20 or less, more preferably 15 or less, more preferably 10 or less, most preferably 5 or less cameras. It is advantageous if the light receiving unit comprises 8 to 18 cameras since the whole pharmaceutical cylindrical container can be inspected whereas the light receiving unit needs not so much space. A light receiving unit comprising 11 to 14 cameras is very advantageous because a good inspection of the whole pharmaceutical cylindrical container is still possible with a minimum of space needed for the light receiving unit.

The additional cameras could be arranged such that the main camera and two or more, preferably three or more, preferably 4 or more cameras are placed in a line in the horizontal plane. This has the advantage that a very detailed inspection of the whole cylindrical part of the pharmaceutical cylindrical container can be obtained.

In addition, the light receiving unit preferably comprises one camera that acquires: an image of the bottom of the pharmaceutical cylindrical container; and/or an overview image of the whole pharmaceutical cylindrical container and/or an image of a sealing surface of the pharmaceutical cylindrical container and/or an image of a shoulder of the pharmaceutical cylindrical container and/or an image of the inside of an opening of the pharmaceutical cylindrical container and/or an image of the outside of an opening of the pharmaceutical cylindrical container and/or an image of the neck of the pharmaceutical cylindrical container.

The pixel and sensor size and the amount of pixels of the camera(s) are not particularly limited. However, if the pixel and the sensor size and the number of pixels is too small, the image noise increases and the image sharpness decreases. If the sensor size is too big, costs for the camera(s) increase excessively and also the size of the camera(s) increase making it difficult to install it/them in the apparatus. In addition, as bigger the camera(s) as more difficult it is to arrange the cameras around the container. For this reason, at least the main camera preferably exhibit the following properties: the pixel size is 3 μm*3 μm or more and 15 μm*15 μm or less, preferably 4 μm*4 μm or more and 10 μm*10 μm or less, more preferably 5 μm*5 μm or more and 7 μm*7 μm or less; the sensor size is 3 mm*5 mm or more and 15 mm*20 mm or less, preferably 4 mm*7 mm or more and 10 mm*15 mm or less, more preferably 5 mm*8 mm or more and 9 mm*12 mm or less; and/or the number of pixels is 1.5 or more and 5.0 or less megapixels, preferably 1.8 or more and 3.5 or less megapixels, more preferably 2.0 or more and 3.0 or less megapixels.

More preferably, the main camera exhibits the above described properties, more preferably all cameras of the light receiving unit are the same cameras and most preferably all cameras of the light receiving unit are the same cameras and exhibit the above described properties.

The distance between the cameras to the pharmaceutical cylindrical container is not particular limited. However, if the distance is too long, the quality of the images decreases and the needs of the cameras increase. If the distance is too small, it is not possible to arrange many cameras. Thus, preferably, the distance between the main camera and the support device is preferably 50 mm or more and 600 or less, more preferably 80 mm to 450 mm, more preferably 100 mm to 350 mm. More preferably, in the following equation:

$$x = a/b$$

wherein a is the number of pixels of the main camera and b is the distance between the main camera and support device in mm; x is $1*10^4$ [mm$^{-1}$] or more and $5*10^5$ [mm$^{-1}$] or less, preferably $5*10'$ [mm$^{-1}$] or more and $3*10^5$ [mm$^{-1}$] or less, more preferably $1*10^5$ [mm$^{-1}$] or more and $2*10^5$ [mm$^{-1}$] or less. If x is in the above described range, it is possible to detect even very small defects.

Preferably, the centerline of the main camera intersects the vertical plane at an angle of 60° or more and 90° or less, preferably 70° or more and 90° or less, more preferably 80° or more and 90° or less, most preferably about 90° and/or, preferably and, the horizontal and transversal planes at an angle of 0° or more and 30° or less, preferably 0° or more and 20° or less, more preferably 0° or more and 10° or less, most preferably about 0°. Arranging the main camera in this way is advantageous because an image of the whole pharmaceutical cylindrical container can be acquired.

According to the invention, the apparatus comprises a light emitting unit, wherein the light emitting unit comprises with regard to the main camera a radial dark field light source, an axial dark field light source and a bright field light source.

In general, the radial dark field light source, the axial dark field light source and the bright field light source can emit polarized and/or unpolarized light. Using unpolarized light has the advantage that light being reflected from the container will be polarized, if the container does not contain any structural defects. Hence, by analyzing the polarization of the reflected light, structural defects are detectable.

According to a preferred embodiment, the bright field light source, the axial dark field light source and the radial dark field light source comprise each light emitting planes, wherein the emitting planes exhibit one or more of the following: the bright field light emitting plane has a size in the range of 20 $cm^2$ to 2000 $cm^2$, preferably 15 $cm^2$ to 1000 $cm^2$, more preferably 25 $cm^2$ to 600 $cm^2$; the axial dark field light emitting plane has a size in the range of 0.5 $cm^2$ to 1000 $cm^2$, preferably 0.8 $cm^2$ to 200 $cm^2$, more preferably 1.0 $cm^2$ to 64 $cm^2$; and the radial dark field light emitting plane has a size in the range of 0.5 $cm^2$ to 2000 $cm^2$, preferably 0.8 $cm^2$ to 1000 $cm^2$, more preferably 1 $cm^2$ to 400 $cm^2$.

According to a preferred embodiment, the bright field light source, the axial dark field light source and the radial dark field light source comprise each light emitting planes, wherein the emitting planes exhibit one or more of the following: the color temperature of each light emitting plane is between 2000 K and 7000 K, preferably 3000 K to 6000 K, more preferably 4000 K to 5000 K; the luminous flux of each of the light emitting planes of the axial and the radial dark field light sources are higher than the luminous flux of the light emitting planes of the bright field light source; and the distance between each of the light emitting planes and the support device is between 5 to 40 cm, preferably 8 to 30 cm, more preferably 10 to 20 cm.

In a preferred embodiment, the centerline of the main camera and the centerline of the bright field light source intersect the vertical plane at an angle of 60° or more and 90° or less, preferably 70° or more and 90° or less, more preferably 80° or more and 90° or less, most preferably about 90° and the horizontal and transversal planes at an angle of 0° or more and 30° or less, preferably 0° or more and 20° or less, more preferably 0° or more and 10° or less, most preferably about 0° and the centerline of the bright field light source touches the pharmaceutical cylindrical container and the lens of the main camera; and the centerline of the axial dark field light source intersects the transversal plane at an angle of 60° or more and 90° or less, preferably 70° or more and 90° or less, more preferably 80° or more and 90° or less, most preferably about 90° and the horizontal and vertical planes at an angle of 0° or more and 30° or less, preferably 0° or more and 20° or less, more preferably 0° or more and 20° or less, most preferably about 0° and the centerline of the axial dark field light source touches the pharmaceutical cylindrical container and does not touch the lens of the main camera; and the centerline of the radial dark field light source intersects the horizontal plane at an angle of 100 or more and 90° or less, preferably 450 or more and 90° or less, more preferably 70° or more and 90° or less, most preferably about 90° and the transversal and vertical planes at an angle of 0° or more and 700 or less, preferably 0° or more and 450 or less, more preferably 0° or more and 20° or less, most preferably about 0° and the centerline of the axial dark field light source touches the pharmaceutical cylindrical container and does not touch the lens of the main camera.

According to the invention, the apparatus comprises with regard to the main camera a bright field light source. The bright field light source can either be an incident or a transmitted light source. Preferably, the bright field light source is a transmitted light source, i.e. the bright field light source is arranged that light emitting from the bright field light source permeates the pharmaceutical cylindrical container and then directly strikes the lens of the main camera. For this reason, it is preferred that with regard to the pharmaceutical cylindrical container the bright field light source is arranged on the opposite of the main camera.

Preferably, the centerline of the bright field light source intersects the vertical plane at an angle of 60° or more and 90° or less, preferably 70° or more and 90° or less, more preferably 80° or more and 90° or less, most preferably about 90° and/or, preferably and, the horizontal and transversal planes at an angle of 0° or more and 30° or less, preferably 0° or more and 20° or less, more preferably 0° or more and 10° or less, most preferably about 0°. More preferably, the centerline of the bright field light source intersects the vertical plane at an angle of 60° or more and 90° or less, preferably 70° or more and 90° or less, more preferably 80° or more and 90° or less, most preferably about 90° and the horizontal and transversal planes at an angle of 0° or more and 30° or less, preferably 0° or more and 20° or less, more preferably 0° or more and 10° or less, most preferably about 0° and the centerline of the bright field light source touches the pharmaceutical cylindrical container and the lens of the main camera.

By an image, solely obtained by an above-described bright field illumination, defects get visible, which absorb and/or scatter light. However, the fine structures are faintly visible or invisible, especially if their optical density and contrast are very low. Furthermore, it is not possible to differentiate between defects on the surface and defects inside the pharmaceutical cylindrical container and very small defects cannot be detected. In an image using bright field illumination, the background appears bright and the defects appear dark.

According to a preferred embodiment, the light emitting unit comprises a light source with a first light emitting plane and a second light emitting plane adjoining each other and wherein the first light emitting plane and the second light emitting plane intersect at an angle in the range of 10° to 80°, preferably 30° to 60°, preferably 40° to 50°, more preferably about 45°. An advantage of an arrangement of these two light emitting planes is that the lateral side of the pharmaceutical cylindrical container as well as the bottom and/or an opening of the pharmaceutical cylindrical container could be illuminated homogeneously. An angle in the range of 30° to 60°, preferably 40° to 50°, more preferably of 45° has the advantage that an optimal illumination is achieved, whereas the light sources need only little space.

In addition, according to the invention, the apparats comprises with regard to the main camera an axial and a radial dark field light source. Each dark field light source can comprise a dark field light emitting plane. In general, the dark field light source is arranged such that light emitting from the dark field light emitting plane permeates the pharmaceutical cylindrical container but does not strike directly the lens of the main camera. For this reason, it is preferred that the dark field light source is laterally arranged from the centerline of the main camera. The axial and the radial dark field light source have in common that both are laterally arranged from the centerline of the main camera. However, they differ in the orientation with regard to the pharmaceutical cylindrical container.

Preferably, the centerline of the axial dark field light source intersects the transversal plane at an angle of 60° or more and 90° or less, preferably 70° or more and 90° or less, more preferably 80° or more and 90° or less, most preferably about 90° and/or, preferably and, the horizontal and vertical planes at an angle of 0° or more and 30° or less, preferably 0° or more and 20° or less, more preferably 0° or more and 20° or less, most preferably about 0°. More preferably, the centerline of the axial dark field light source intersects the transversal plane at an angle of 60° or more and 90° or less, preferably 70° or more and 90° or less, more preferably 80° or more and 90° or less, most preferably about 90° and the horizontal and vertical planes at an angle of 0° or more and 30° or less, preferably 0° or more and 20° or less, more preferably 0° or more and 20° or less, most preferably about 0° and the centerline of the axial dark field light source touches the pharmaceutical cylindrical container and does not touch the lens of the main camera.

Preferably, the centerline of the radial dark field light source intersects the horizontal plane at an angle of 10° or more and 90° or less, preferably 45° or more and 90° or less, more preferably 70° or more and 90° or less, most preferably about 90° and/or, preferably and, the transversal and vertical planes at an angle of 0° or more and 70° or less, preferably 0° or more and 45° or less, more preferably 0° or more and 20° or less, most preferably about 0°. More preferably, the centerline of the radial dark field light source intersects the horizontal plane at an angle of 10° or more and 90° or less, preferably 45° or more and 90° or less, more preferably 70° or more and 90° or less, most preferably about 90° and the transversal and vertical planes at an angle of 0° or more and 70° or less, preferably 0° or more and 45° or less, more preferably 0° or more and 20° or less, most preferably about 0° and the centerline of the axial dark field light source touches the pharmaceutical cylindrical container and does not touch the lens of the main camera.

With a dark field illumination, high-density light-reflecting objects can be examined as well as very small, low-density objects, if they result in diffraction of the incident light. With a dark field illumination very small defects can be detected. In an image using dark field illumination, the background appears dark and the defects appear bright.

The inventors recognized that with only one dark field light source, for example the radial dark field light source, defects which extend in the direction of the centerline of said dark field light source cannot be detected sufficiently. This problem was solved by arranging a second dark field light source, for example the axial dark field light source as described above, illuminating the defect from another direction. Only by illuminating defects from two different directions with two dark field light sources, i.e. an axial and radial dark field light source, defects in the pharmaceutical cylindrical container can be detected sufficiently. In addition, an illumination of a pharmaceutical cylindrical container without causing any shadow with a bright field and the two dark field light sources is only possible if the apparatus comprises a support device, wherein the support device supports the pharmaceutical cylindrical container on its lateral surface, such that the pharmaceutical cylindrical container is rotatable around its longitudinal axis. Only by holding the pharmaceutical cylindrical container on its lateral surface and rotating it successively around its longitudinal axis while taking at each progress of the rotation an image with bright field illumination and a further picture(s) with the axial and radial dark field illuminations, an extraordinary detection of all small and big defects can be managed. By holding the pharmaceutical cylindrical container on its lateral surface and rotating it around its longitudinal axis it is possible to obtain an image of each position of the cylindrical part of the pharmaceutical cylindrical container illuminated by the bright light field source and the axial and radial dark field sources. Only by a combination of the specific support device, the bright field light source, and the radial and axial dark field light sources, it is possible to visualize defects and classify the defect types of the complete pharmaceutical cylindrical container in a very short time.

In preferred embodiment at least one light source, i.e. one of the dark field light sources and/or the bright field light source emit(s) polarized light. By using polarized light, the polarization of the light transmitted through the container will be affected by structural defects of the container. Hence, by analyzing the polarization of the light transmitted through the container, structural defects are detectable.

In a further preferred embodiment, the light emitting unit comprises at least one light source that emits polarized light and at least one depolarizer being arranged between the light source and the pharmaceutical cylindrical container. This has the advantage that a light source emitting polarized light can be arranged, wherein the inspection beam will be unpolarized by the depolarizer.

Further preferred embodiments of the present invention are those, which comprises one or more of the specific light emitting unit(s) and light receiving unit(s), more preferably in the specific arrangement, as described in the European patent applications EP 20153308.0 as filed Jan. 23, 2020 and EP 20153330.4 as filed Jan. 23, 2020, which are incorporated herein by reference.

According to a preferred embodiment, the apparatus comprises a control unit for controlling the support device, especially the friction wheel of the support device, the light emitting unit, and the light receiving unit. By providing a control unit, the activation/deactivation of the light receiving unit and/or of the light emitting unit and/or of the friction wheel can be controlled such that a visualization of the whole pharmaceutical cylindrical container is achieved with a high stroke, such that a maximum of pharmaceutical cylindrical containers can be inspected in a minimum of time. Preferably, the control unit is configured to measure one pharmaceutical cylindrical container in 0.3 to 10 seconds, more preferably in 0.5 to 8 seconds, more preferably in about 1 second. These short measurement times can be achieved by an apparatus according to the invention due to excellent coordination of the angles of the light sources and the camera to each other, as well as the specific type of sequential measurement (see below).

In a preferred embodiment, the control unit is configured to rotate the pharmaceutical cylindrical container 360° around its longitudinal axis. Hence, the light receiving unit can acquire images of the whole pharmaceutical cylindrical container such that defects can be detected independent from their location and/or orientation on or within the material of the pharmaceutical cylindrical container.

According to another embodiment, the control unit is configured to rotate the pharmaceutical cylindrical container in increments between 0.5° and 4°, preferably 0.5° and 3.5°, more preferably 1° and 3°, most preferably 2°. Rotating the pharmaceutical cylindrical container with the before mentioned increments is advantageous because sufficient images can be acquired to create a virtual 3D image of the pharmaceutical cylindrical container and the cameras have enough time to take the pictures using different illuminations at the same position. Based on this 3D image it can be determined whether the pharmaceutical cylindrical container fulfills the quality standards.

In a preferred embodiment, the control unit is configured to rotate the pharmaceutical cylindrical container in between the image acquisitions.

In a preferred embodiment, the control unit is configured to adjust the activation/deactivation of each camera of the light receiving unit and of each light emitting plane of the light emitting unit based on the speed of the friction wheel. By such a configuration, the apparatus can be operated at any speed and the speed can variate within the measurement of one pharmaceutical cylindrical container. This might be necessary to adjust the speed of the apparatus to varying production speeds.

In a preferred embodiment, the control unit is configured: to measure one pharmaceutical cylindrical container in 0.3 to 10 seconds, more preferably in 0.5 to 8 seconds, more preferably in about 1 second; to rotate the pharmaceutical cylindrical container 360° around its longitudinal axis; to rotate the pharmaceutical cylindrical container in increments between 0.5° and 4°, preferably 0.5° and 3.5°, more preferably 1° and 3°, most preferably 2°; to rotate the pharmaceutical cylindrical container in between the image acquisitions; and/or to adjust the activation/deactivation of each camera of the light receiving unit and of each light emitting plane of the light emitting unit based on the speed of the friction wheel.

In a further preferred embodiment the control unit is configured to fulfill any combination of the above mentioned properties.

In a preferred embodiment, the control unit is configured to activate the bright field light source, the axial dark field light source and/or the radial dark field light source of the light emitting unit and the main camera of the light receiving unit to acquire at least one image such that: at least one image of the pharmaceutical cylindrical container is acquired when, preferably only, with regard to the main camera the bright field light source is activated, and/or at least one image of the pharmaceutical cylindrical container is acquired when, preferably only, with regard to the main camera the axial dark field light source is activated, and/or at least one image of the pharmaceutical cylindrical container is acquired when, preferably only, with regard to the main camera the radial dark field light source is activated, and/or at least one image of the pharmaceutical cylindrical container is acquired when, preferably only, with regard to the main camera the radial and axial dark field light sources are activated.

In one embodiment, the control unit is configured such that one pharmaceutical cylindrical container can be inspected in one second or less, preferably 0.9 s or less, preferably 0.8 s or less, more preferably in 0.6 to 0.9 s, preferably in 0.7 to 0.8 s. That means that within that time period enough images can be acquired that a 3D image of the pharmaceutical cylindrical container can be generated showing all defects having a size of 200 µm or more, preferably 100 µm or more, more preferably 50 µm or more, more preferably 40 µm or more, more preferably 20 µm or more, most preferably 16 µm or more, preferably independent on the orientation of the defects.

After images at all positions of the rotating pharmaceutical cylindrical container with all above described kinds of illumination have been obtained, it is possible that a computer fits together all images to obtain a 3D image of the pharmaceutical cylindrical container. In this 3D image, it is possible to differ between the different kinds of defects and it is also possible to determine the position and orientation of the defect. This is possible due to the specific arrangement of the camera and the light sources around the pharmaceutical cylindrical container as described above. If the apparatus comprises more cameras and more light sources as described above, a complete image of the pharmaceutical cylindrical container, including the non-cylindrical ends of the pharmaceutical cylindrical container, can be obtained. Thus, it is necessary that the apparatus comprises at least a bright filed light source, an axial dark field light source and a radial dark field light source in the specific arrangement with regard to the pharmaceutical cylindrical container and the main camera as described above to detect defects independent on the orientation of the defect and position, e.g. the surface of the pharmaceutical cylindrical container or inside the wall of the pharmaceutical cylindrical container. The minimum size of the defects, which can be detected with the above described apparatus depends on the distance, amount of pixels, sensor size, etc. of the camera. With cameras according to the invention, for example the camera acA1920-155 um from Basler with the sensor IMX174 CMOS from Sony, defects having a size of 16 µm or more independent on the orientation and position of the defect can be detected accurately.

In a further preferred embodiment, the control unit is configured to disregard a pharmaceutical cylindrical container from further processing, if a defect at a pharmaceutical cylindrical container is detected which exhibits a size of 200 µm or more, preferably 100 µm or more, more preferably 50 µm or more, more preferably 40 µm or more, more preferably 20 µm or more, most preferably 16 µm or more, preferably independent on the orientation and position of the defect. This can be achieved, for example, by a trap door.

More preferably, the control unit is configured to disregard a pharmaceutical cylindrical container from further processing, if a defect at a pharmaceutical cylindrical container is detected, which exhibits one or more of the following properties: the defect is a metallic defect on the surface of the pharmaceutical cylindrical container; the defect is a non-metallic defect on the surface of the pharmaceutical cylindrical container; the defect is an bubble within the wall or on the surface of pharmaceutical cylindrical container; the defect is a metallic defect within the wall of pharmaceutical cylindrical container; and/or the defect is a non-metallic defect within the wall of the pharmaceutical cylindrical container; and the defect has a size of 80 µm or more, more preferably 50 µm or more, more preferably 40 µm or more, more preferably 20 µm or more, most preferably 16 µm or more, preferably independent on the orientation of the defect.

In a further preferred embodiment the control unit is configured to disregard a pharmaceutical cylindrical container from further processing, if a defect at a pharmaceutical cylindrical container is detected which exhibits any combination of the above mentioned properties.

Hence, only pharmaceutical cylindrical container fulfilling highest quality standards will be further processed.

A further embodiment provides an apparatus for inspecting a pharmaceutical cylindrical container made of glass or of a polymer, wherein the apparatus is configured such that the pharmaceutical cylindrical container is inspected in one second or less, preferably 0.9 s or less, preferably 0.8 s or less, more preferably in 0.6 to 0.9 s, preferably in 0.7 to 0.8 s; and/or wherein the apparatus is configured such that a defect comprising a size of 200 µm or more, preferably 100 µm or more, more preferably 50 µm or more, more preferably 40 μm or more, more preferably 20 μm or more, most preferably 16 μm or more; preferably independent on the orientation and position of the defect, is detectable; and/or wherein the apparatus is configured such that a defect is detectable which exhibits one or more of the following properties: the defect is a metallic defect on the surface of the pharmaceutical cylindrical container (1), and/or the defect is a non-metallic defect on the surface of the pharmaceutical cylindrical container (1), and/or the defect is an bubble within the wall or on the surface of pharmaceutical cylindrical container (1), and/or the defect is a metallic defect within the wall of pharmaceutical cylindrical container (1), and/or the defect is a non-metallic defect within the wall of the pharmaceutical cylindrical container (1), and the defect has a size of 80 μm or more, more preferably 50 μm or more, more preferably 40 μm or more, more preferably 20 μm or more, most preferably 16 μm or more, preferably independent on the orientation of the defect.

In addition, the invention refers to a method for inspecting a pharmaceutical cylindrical container made of glass or of a polymer, comprising the following steps: arranging the pharmaceutical cylindrical container with its lateral surface on the support device, rotating the pharmaceutical cylindrical container around its longitudinal axis, preferably wherein the rotation is performed in increments, and activating the light emitting unit and the light receiving unit for acquiring at least one image of the pharmaceutical cylindrical container.

Preferably, the rotation is performed in such a way that the object is rotated 360° around its longitudinal axis and/or wherein the rotation is performed with increments between 0.5° and 4°, preferably 0.5° and 3.5°, more preferably 1° and 3°, most preferably 2°. By performing a 360° rotation with increments, the whole pharmaceutical cylindrical container can be measured and there is enough time to acquire the different images at the respective position of the pharmaceutical cylindrical container and the quality of the images is improved.

Preferably, the light emitting unit and the light receiving unit are each activated to acquire the at least one image such that at least one image of the pharmaceutical cylindrical container is acquired when, preferably only, with regard to the main camera the bright field light source is activated to obtain a bright field image, and/or at least one image of the pharmaceutical cylindrical container is acquired when, preferably only, with regard to the main camera the axial dark field light source is activated to obtain a axial dark field image, and/or at least one image of the pharmaceutical cylindrical container is acquired when, preferably only, with regard to the main camera the radial dark field light source is activated to obtain a radial dark field image, and/or at least one image of the pharmaceutical cylindrical container is acquired when, preferably only, with regard to the main camera the radial and axial dark field light sources are activated to obtain a axial and radial dark field image.

Preferably, the bright field image, the axial dark field image, the radial dark field image and/or the axial and radial dark field image are acquired in a sequence and wherein the pharmaceutical cylindrical container is rotated around its longitudinal axis in increments between 0.5° and 4°, preferably 0.5° and 3.5°, more preferably 1° and 3°, most preferably 2° in between the image acquisitions. Thus, the quality can be further improved.

A further embodiment of the invention describes a bundle of pharmaceutical cylindrical container made of glass or of a polymer, wherein the bundle comprises 10 or more, preferably 10 to 1000, more preferably 20 to 500, most preferably 40 to 250 pharmaceutical cylindrical containers; and wherein each pharmaceutical cylindrical container exhibits no defect having a size of 200 μm or more, preferably 100 μm or more, more preferably 50 μm or more, more preferably 40 μm or more, more preferably 20 μm or more, most preferably 16 μm or more, preferably independent on the orientation and position of the defect.

A further embodiment of the invention describes a bundle of pharmaceutical cylindrical container made of glass or of a polymer, preferably according to the above described embodiment, wherein the bundle comprises 10 or more, preferably 10 to 1000, more preferably 20 to 500, most preferably 40 to 250 pharmaceutical cylindrical containers; and wherein each pharmaceutical cylindrical container exhibits no defect which exhibits one or more of the following properties: the defect is a metallic defect on the surface of the pharmaceutical cylindrical container, and/or the defect is a non-metallic defect on the surface of the pharmaceutical cylindrical container, and/or the defect is an bubble within the wall or on the surface of pharmaceutical cylindrical container, and/or the defect is a metallic defect within the wall of pharmaceutical cylindrical container, and/or the defect is a non-metallic defect within the wall of the pharmaceutical cylindrical container; and the defect has a size of 80 μm or more, more preferably 50 μm or more, more preferably 40 μm or more, more preferably 20 μm or more, most preferably 16 μm or more, preferably independent on the orientation of the defect.

In a further preferred embodiment the bundle according to any one of the embodiments of the above described embodiments comprises 10 or more, preferably 10 to 1000, more preferably 20 to 500, most preferably 40 to 250 pharmaceutical cylindrical containers; and wherein each pharmaceutical cylindrical container exhibits no defect which exhibits one or more of the following properties: the defect is a metallic defect on the surface of the pharmaceutical cylindrical container, and/or the defect is a non-metallic defect on the surface of the pharmaceutical cylindrical container, and/or the defect is an bubble within the wall or on the surface of pharmaceutical cylindrical container, and/or the defect is a metallic defect within the wall of pharmaceutical cylindrical container, and/or the defect is a non-metallic defect within the wall of the pharmaceutical cylindrical container; and the defect has a size of 80 μm or more, more preferably 50 μm or more, more preferably 40 μm or more, more preferably 20 μm or more, most preferably 16 μm or more, preferably independent on the orientation of the defect.

Hence, fulfilling above properties, a bundle containing pharmaceutical cylindrical containers fulfilling highest quality standards are obtained. These specific containers can be used for high standard application, wherein even smallest defects can effect the pharmaceutical composition.

BRIEF DESCRIPTION OF THE DRAWINGS

There are several ways how to design and further develop the teaching of the present invention in an advantageous way. To this end, preferred examples of embodiments of the invention, illustrated by the figures on the other hand. In connection with the explanation of the preferred embodiments by the aid of the figures, generally preferred embodiments and further developments of the teaching will be explained.

DETAILED DESCRIPTION

FIG. 1 shows an embodiment of the apparatus. The apparatus comprises a not shown support device for supporting a pharmaceutical cylindrical container 1 on its lateral surface such that the container 1 is rotatable around its longitudinal axis 2. The longitudinal axis 2 of the pharmaceutical cylindrical container 1 and a horizontal axis being perpendicular to the longitudinal axis 2 define a horizontal plane 3. Further, the longitudinal axis 2 of the pharmaceutical cylindrical container 1 and a vertical axis being perpendicular to the longitudinal axis 2 define a vertical plane 4. In addition, a horizontal axis being perpendicular to the longitudinal axis 2 of the pharmaceutical cylindrical container 1 and a vertical axis being perpendicular to the longitudinal axis and intersecting the middle of a cylindrical part of the pharmaceutical cylindrical container 1 define a transversal plane 5. A skilled person will understand FIG. 1 only shows half of the container 1 since the transversal plane 8 covers the other half of the container 1.

Further, the apparatus comprises a light receiving unit with a main camera 6 and a light transmitting unit with a bright field light source 7, a radial dark field light source 8 and a not shown axial dark field light source 9. Furthermore, FIG. 1 shows the centerline 10 of the main camera 6, the centerline 11 of the bright field light source 7, the centerline 12 of the radial dark field light source 8 and the centerline 13 of the not shown axial dark field light source 9. The centerline 13 of the axial dark field light source 9 corresponds in this embodiment to the longitudinal axis 2 of the container 1.

Figure 2:
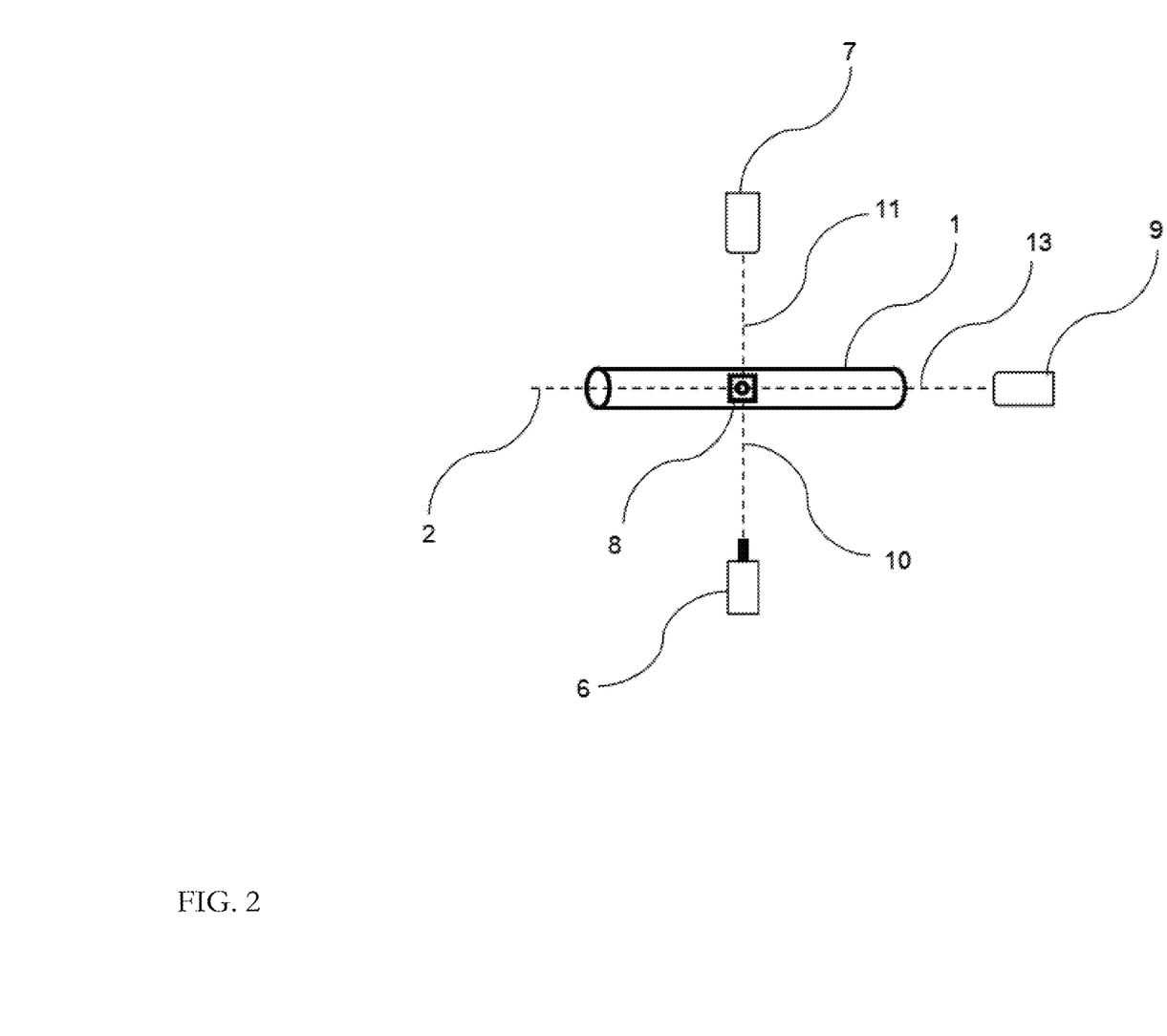
FIG. 2 shows in a schematic top view an embodiment of an apparatus.
Figure 3:
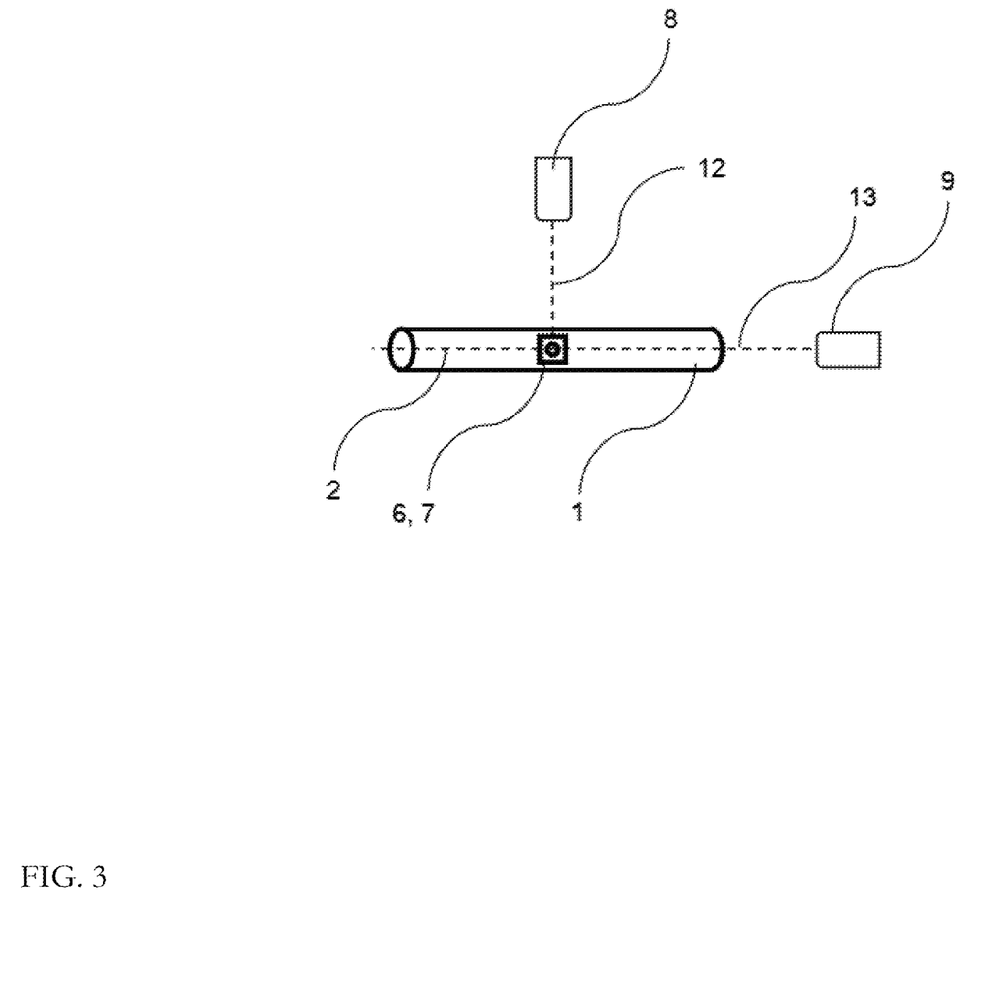
FIG. 3 shows in a schematic side view an embodiment of an apparatus.
Figure 4:
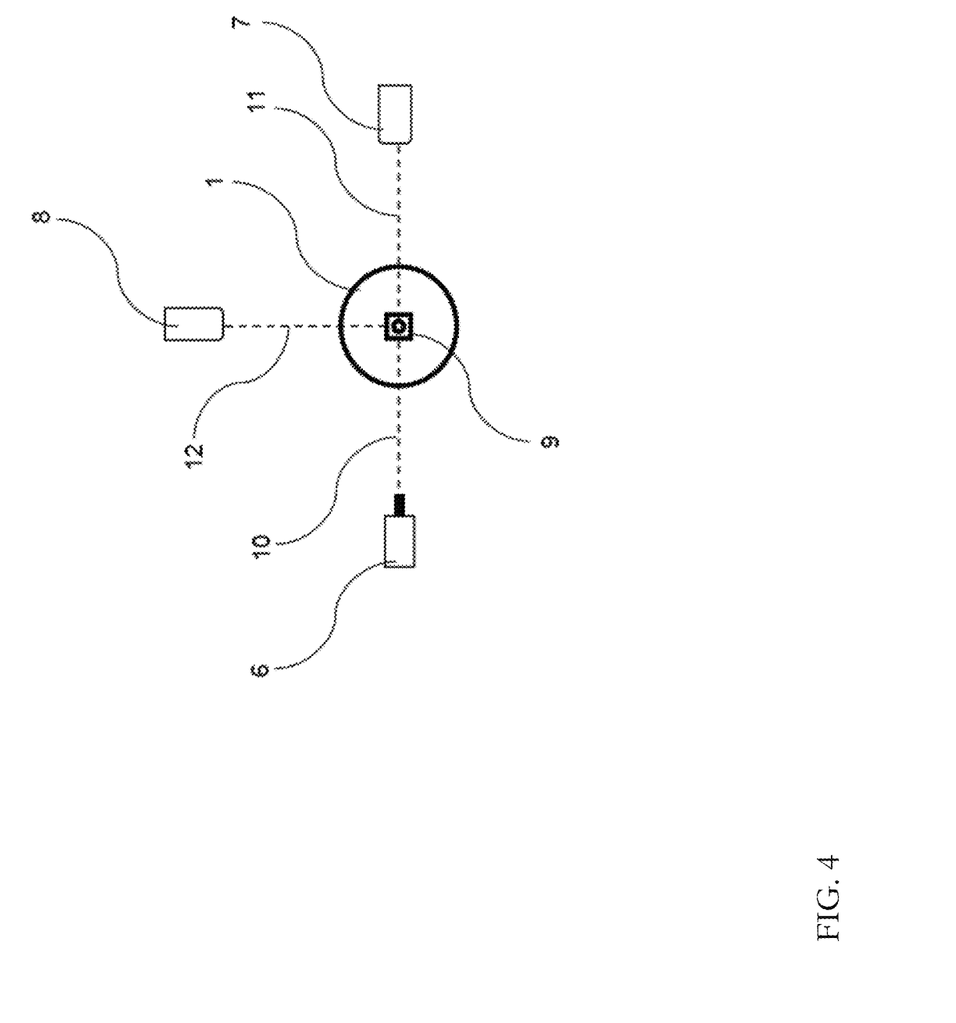
FIG. 4 shows in a schematic front view an embodiment of an apparatus.

FIGS. 2 to 4 show different views of the apparatus according to FIG. 1. Especially the axial dark field light source 8 is shown. Since the embodiment of FIG. 2 to 4 corresponds to the embodiment of FIG. 1 the description of FIG. 1 is referred to here, as it analogously applies to FIG. 2 to 4.

Figure 5:
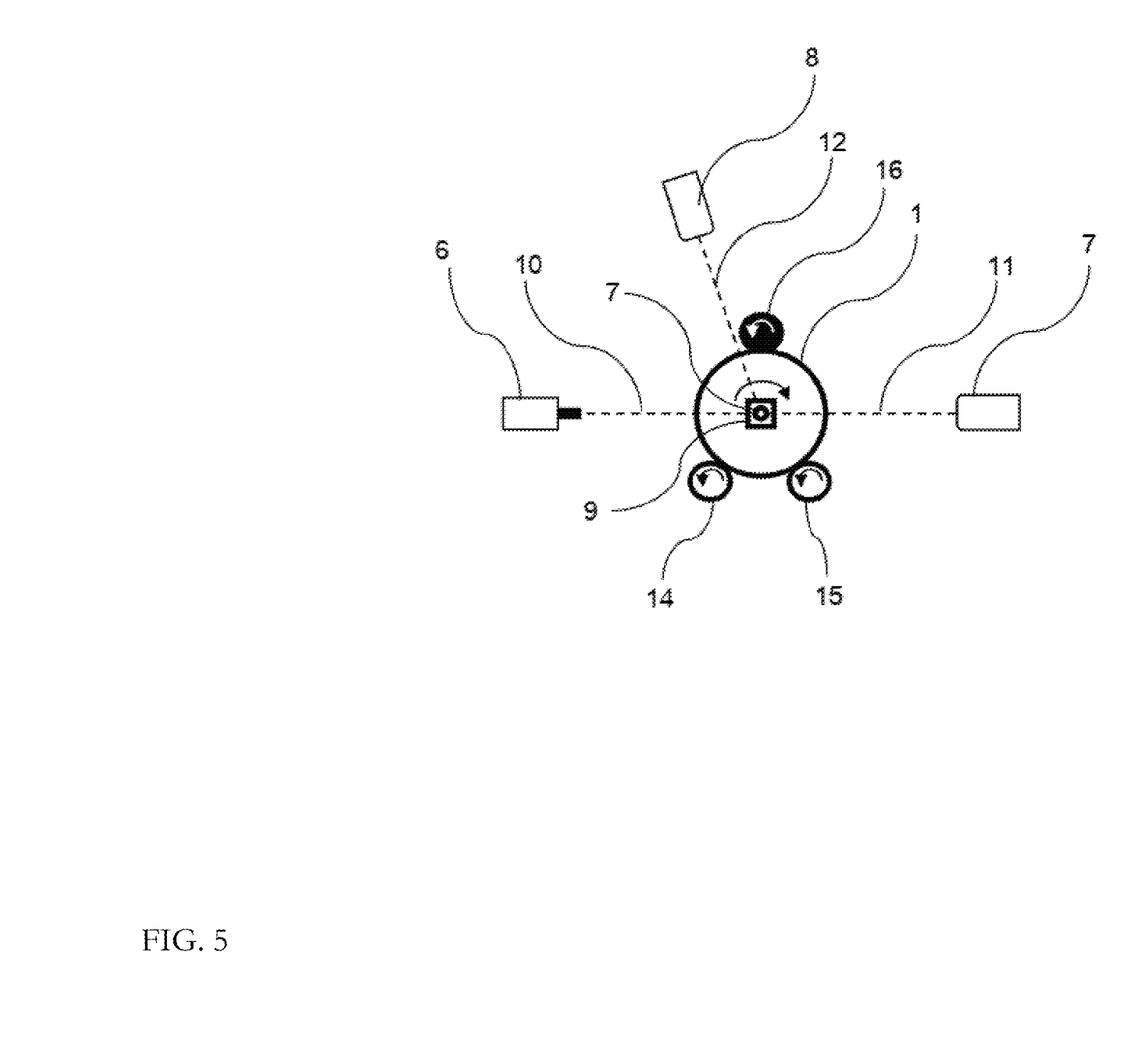
FIG. 5 shows in a further schematic front view an embodiment of an apparatus.

FIG. 5 shows another embodiment of an apparatus. In this embodiment the support device is shown in detail. The support device comprises a first support wheel 14 and a second support wheel 15. The first support wheel 14 and the second support wheel 15 support the container 1 on its lateral surface. Furthermore, a friction wheel 16 is arranged such that the container 2 can be rotated around its longitudinal axis 12. In addition, the apparatus comprises a main camera 6, a bright field light source 7, a radial dark field light source 8 and an axial field light source 9.

Except for the support and the positioning of the radial dark field light source 8, the embodiment of FIG. 5 corresponds to the embodiment of FIG. 1 to 4. As such, the description of FIG. 1 to 4 is referred to here, as it analogously applies to FIG. 5.

Figure 6:
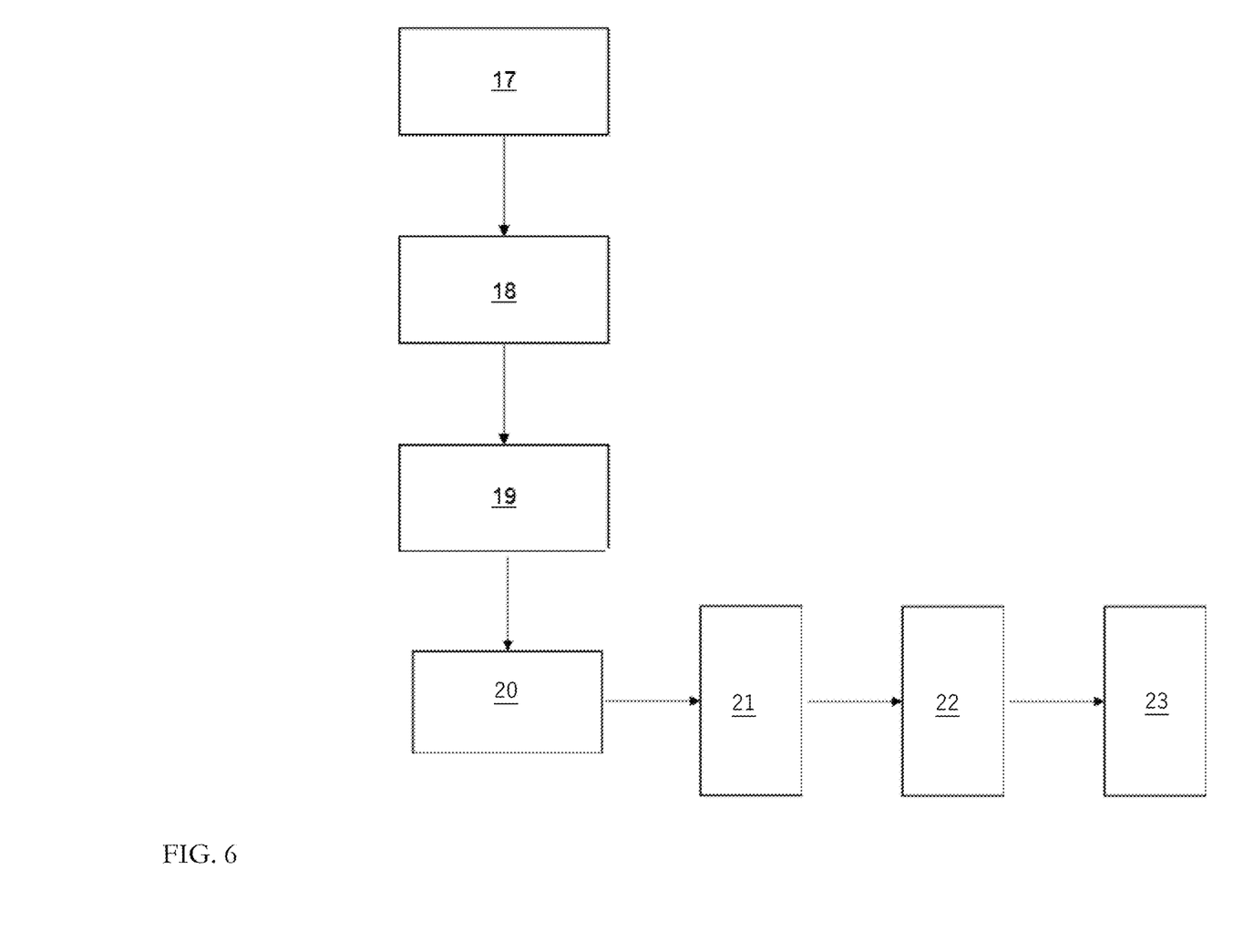
FIG. 6 shows a block diagram of an embodiment of the method.

FIG. 6 shows a block diagram of an embodiment of the method. The method serves to inspecting a pharmaceutical cylindrical container made of a glass or of a polymer.

In a first step 17 the pharmaceutical cylindrical container is arranged with its lateral surface on the support device. In a second step 18 the pharmaceutical cylindrical container is rotated around its longitudinal axis, wherein the rotation is preferably performed in increments. In a third step 19, the light emitting unit and the light receiving unit are activated for acquiring at least one image of the pharmaceutical cylindrical container.

In a fourth step 20, pharmaceutical cylindrical containers having defects as set forth herein are disregarded, while in a fifth step 21 the remaining containers are formed into a bundle. During the fifth step 21, bundles can be separated by a spacer, for example a plastic or paper sheet or can be positioned in a holding device, for example a nest, tub or tray, so that they are not in contact with each other during transport.

In a sixth step 22 and seventh step 23, the bundles are at least partly covered or encased by a plastic foil and are sterilized. In some embodiments, the sixth step 22 is a sterilization process, e.g. steam sterilized or sterilized by gamma rays, with the sterilized bundle being then covered or encased in the plastic foil in the seventh step 23. In other embodiments, the bundle is first covered or encased in the plastic foil in the sixth step 22, followed by a sterilization process, e.g. sterilized by gamma rays, in the seventh step 23.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 container
2 longitudinal axis (container)
3 horizontal plane
4 vertical plane
5 transversal plane
6 main camera
7 bright field light source
8 radial dark field light source
9 axial field light source
10 centerline main camera
11 centerline bright field light source
12 centerline radial dark field light source
13 centerline axial dark field light source
14 first support wheel
15 second support wheel
16 friction wheel
17 first step
18 second step
19 third step
20 fourth step
21 fifth step
22 sixth step
23 seventh step

What is claimed is:

1. An apparatus for inspecting a pharmaceutical cylindrical container made of glass or polymer, the apparatus comprising:

a support device configured to support the pharmaceutical cylindrical container and rotate the pharmaceutical cylindrical container around a longitudinal axis;

a light receiving unit comprising a main camera configured to acquire an image of the pharmaceutical cylindrical container;

a light emitting unit comprising, with respect to the main camera, a bright field light source, a radial dark field light source, and an axial dark field light source; and a control unit configured to control the support device, the light emitting unit, and the light receiving unit to acquire a plurality of images of the pharmaceutical cylindrical container, the plurality of images comprising images taken when only the bright field light source is activated and when only the axial and/or radial dark field light sources are activated.

2. The apparatus of claim 1, wherein the support device supports the pharmaceutical cylindrical container so that the longitudinal axis and a horizontal axis perpendicular to the longitudinal axis define a horizontal plane, wherein:

the main camera has a centerline that intersects the horizontal plane at an angle in a range selected from a group consisting of 0° or more and 30° or less, 0° or more and 20° or less, and 0° or more and 10° or less, and/or the bright field light source has a centerline that intersects the horizontal plane at an angle in a range selected from a group consisting of 0° or more and 30° or less, 0° or more and 20° or less, and 0° or more and 10° or less, and/or the axial dark field light source has a centerline that intersects the horizontal plane at an angle in a range selected from a group consisting of 0° or more and 30° or less, 0° or more and 20° or less, and 0° or more and 20° or less, and/or the radial dark field light source has a centerline that intersects the horizontal plane at an angle in a range selected from a group consisting of 100 or more and 90° or less, 450 or more and 90° or less, and 700 or more and 90° or less.

3. The apparatus of claim 1, wherein the support device supports the pharmaceutical cylindrical container so that the longitudinal axis and a vertical axis perpendicular to the longitudinal axis define a vertical plane, wherein:

the main camera has a centerline that intersects the vertical plane at an angle of 60° or more and 90° or less, 70° or more and 90° or less, and 80° or more and 90° or less, and/or the bright field light source has a centerline that intersects the vertical plane at an angle in a range selected from a group consisting of 60° or more and 90° or less, 70° or more and 90° or less, and 80° or more and 90° or less, and/or the axial dark field light source has a centerline that intersects the vertical plane at an angle in a range selected from a group consisting of 0° or more and 30° or less, 0° or more and 20° or less, and 0° or more and 20° or less, and/or the radial dark field light source has a centerline that intersects the vertical plane at an angle in a range selected from a group consisting of 0° or more and 70° or less, 0° or more and 45° or less, and 0° or more and 20° or less.

4. The apparatus of claim 1, wherein the support device supports the pharmaceutical cylindrical container so that a horizontal axis perpendicular to the longitudinal axis and a vertical axis perpendicular to the longitudinal axis intersect a middle of a cylindrical part of the pharmaceutical cylindrical container at a transversal plane, wherein:

the main camera has a centerline that intersects the transversal plane at an angle in a range selected from a group consisting of 0° or more and 30° or less, 0° or more and 20° or less, and 0° or more and 10° or less, and/or the bright field light source has a centerline that intersects the transversal plane at an angle in a range selected from a group consisting of 0° or more and 30° or less, 0° or more and 20° or less, and 0° or more and 10° or less, and/or the axial dark field light source has a centerline that intersects the transversal plane at an angle in a range selected from a group consisting of 60° or more and 90° or less, 70° or more and 90° or less, and 80° or more and 90° or less, and/or the radial dark field light source has a centerline that intersects the transversal plane at an angle in a range selected from a group consisting of 0° or more and 70° or less, 0° or more and 45° or less, and 0° or more and 20° or less.

5. The apparatus of claim 1, wherein the light receiving unit further comprises a plurality of cameras.

6. The apparatus of claim 5, wherein the plurality of the cameras is between 5 to 25 cameras.

7. The apparatus of claim 1, wherein the light emitting unit comprises a property selected from the group consisting of: the bright field light source having a light emitting plane that has a size in a range a range selected from a group consisting of 20 $cm^2$ to 2000 $cm^2$, 15 $cm^2$ to 1000 $cm^2$, and 25 $cm^2$ to 600 $cm^2$; the radial dark field light source having a light emitting plane that has a size in a range a range selected from a group consisting of 0.5 $cm^2$ to 2000 $cm^2$, 0.8 $cm^2$ to 1000 $cm^2$, and 1 $cm^2$ to 400 $cm^2$; the axial dark field light source having a light emitting plane that has a size in a range a range selected from a group consisting of 0.5 $cm^2$ to 1000 $cm^2$, 0.8 $cm^2$ to 200 $cm^2$, and 1.0 $cm^2$ to 64 $cm^2$; and any combinations thereof.

8. The apparatus of claim 1, wherein the bright field light source, the radial dark field light source, and the axial dark field light source each comprise a light emitting plane, wherein:

the light emitting planes have a property selected from the group consisting of: a color temperature between 2000 K and 7000 K, a color temperature between 3000 K to 6000 K, a color temperature between 4000 K to 5000 K, and combinations thereof, and/or the light emitting planes of the axial and the radial dark field light sources each have a luminous flux that are higher than a luminous flux of the light emitting plane of the bright field light source; and/or the support device has a distance between each of the light emitting planes that is in a range selected from a group consisting of 5 to 50 cm, 8 to 30 cm, 10 to 20 cm, and combinations thereof.

9. The apparatus of claim 1, wherein the light emitting unit has a first light emitting plane and a second light emitting plane adjoining each other, wherein the first light emitting plane and the second light emitting plane intersect at an angle in a range selected from a group consisting of 10° to 80 °, 30° to 60°, and 40° to 50°.

10. The apparatus of claim 1, wherein the support device comprises at least two support wheels and a friction wheel arranged such that the pharmaceutical cylindrical container is on the support wheels and is rotatable around the longitudinal axis by the friction wheel.

11. The apparatus of claim 1, wherein the control unit is further configured to control the support device, the light emitting unit, and the light receiving unit to perform a task selected from a group consisting of: measure the pharmaceutical cylindrical container in 0.3 to 10 seconds; rotate the pharmaceutical cylindrical container 360° around the longitudinal axis; rotate the pharmaceutical cylindrical container in increments between 0.5° and 4°; rotate the pharmaceutical cylindrical container in between the image acquisitions;
activate/deactivate the main camera based on the speed of a friction wheel; and any combinations thereof.

12. The apparatus of claim 1, wherein the control unit controls to disregard any container having a defect with a property selected from a group consisting of: a size of 200 µm; a size of 100 µm or more; a size of 80 µm or more; a size of 50 µm or more; a size of 40 µm or more; a size of 20 µm or more; a size of 16 µm or more; a metallic defect on a surface of the pharmaceutical cylindrical container; a non-metallic defect on a surface of the pharmaceutical cylindrical container; a bubble within a wall or on a surface of pharmaceutical cylindrical container; a metallic defect within a wall of pharmaceutical cylindrical container; a non-metallic defect within a wall of the pharmaceutical cylindrical container; and any combinations thereof.

13. A method for inspecting a pharmaceutical cylindrical container made of glass or polymer, comprising:
arranging the pharmaceutical cylindrical container with a lateral surface on a support device;
rotating the pharmaceutical cylindrical container around its longitudinal axis; and
activating a light emitting unit and a light receiving unit to acquire a plurality of images of the pharmaceutical cylindrical container,
wherein the plurality of images comprise images when only a bright field light source is activated and when only an axial dark field light source and/or a radial dark field light source is activated.

14. The method of claim 13, wherein the bright field image, the axial dark field image, the radial dark field image and/or the combined axial and radial dark field image are each acquired after the pharmaceutical cylindrical container is rotated in an increment between 0.5° and 4°.

15. An apparatus for inspecting a pharmaceutical cylindrical container made of glass or polymer, the apparatus comprising:
a support device configured to support the pharmaceutical cylindrical container and rotate the pharmaceutical cylindrical container around a longitudinal axis;
a light receiving unit comprising a main camera configured to acquire an image of the pharmaceutical cylindrical container; and
a light emitting unit comprising, with respect to the main camera, a bright field light source, a radial dark field light source, and an axial dark field light source,
wherein the control unit controls to disregard any container having a defect with a property selected from a group consisting of: a size of 200 µm; a size of 100 µm or more; a size of 80 µm or more; a size of 50 µm or more; a size of 40 µm or more; a size of 20 µm or more; a size of 16 µm or more; a metallic defect on a surface of the pharmaceutical cylindrical container; a non-metallic defect on a surface of the pharmaceutical cylindrical container; a bubble within a wall or on a surface of pharmaceutical cylindrical container; a metallic defect within a wall of pharmaceutical cylindrical container; a non-metallic defect within a wall of the pharmaceutical cylindrical container; and any combinations thereof.

16. The apparatus of claim 15, wherein the control unit is configured to generate a 3D image from the image, the 3D image showing defects on an inner surface of the pharmaceutical cylindrical container, an outer surface of the pharmaceutical cylindrical container, and within a wall of the pharmaceutical cylindrical container.

17. The apparatus of claim 15, wherein the control unit configured to control the support device, the light emitting unit, and the light receiving unit to acquire a plurality of images of the pharmaceutical cylindrical container when only the bright field light source is activated and only when both the axial and radial dark field light sources are activated.

18. The apparatus of claim 1, wherein the control unit is configured to generate a 3D image from the plurality of images, the 3D image showing defects on an inner surface of the pharmaceutical cylindrical container, an outer surface of the pharmaceutical cylindrical container, and within a wall of the pharmaceutical cylindrical container.

19. The apparatus of claim 1, wherein the plurality of images comprise images taken when only the bright field light source is activated and only when both the axial and radial dark field light sources are activated.

20. The method of claim 13, further comprising generating a 3D image from the plurality of images, the 3D image showing defects on an inner surface of the pharmaceutical cylindrical container, an outer surface of the pharmaceutical cylindrical container, and within a wall of the pharmaceutical cylindrical container.

21. The method of claim 13, wherein the plurality of images comprise images taken when only the bright field light source is activated and only when both the axial and radial dark field light sources are activated.

* * * * *